March 30, 1926.  A. WEILAND  1,579,188
SHOCK ABSORBER
Filed August 6, 1925    2 Sheets-Sheet 2
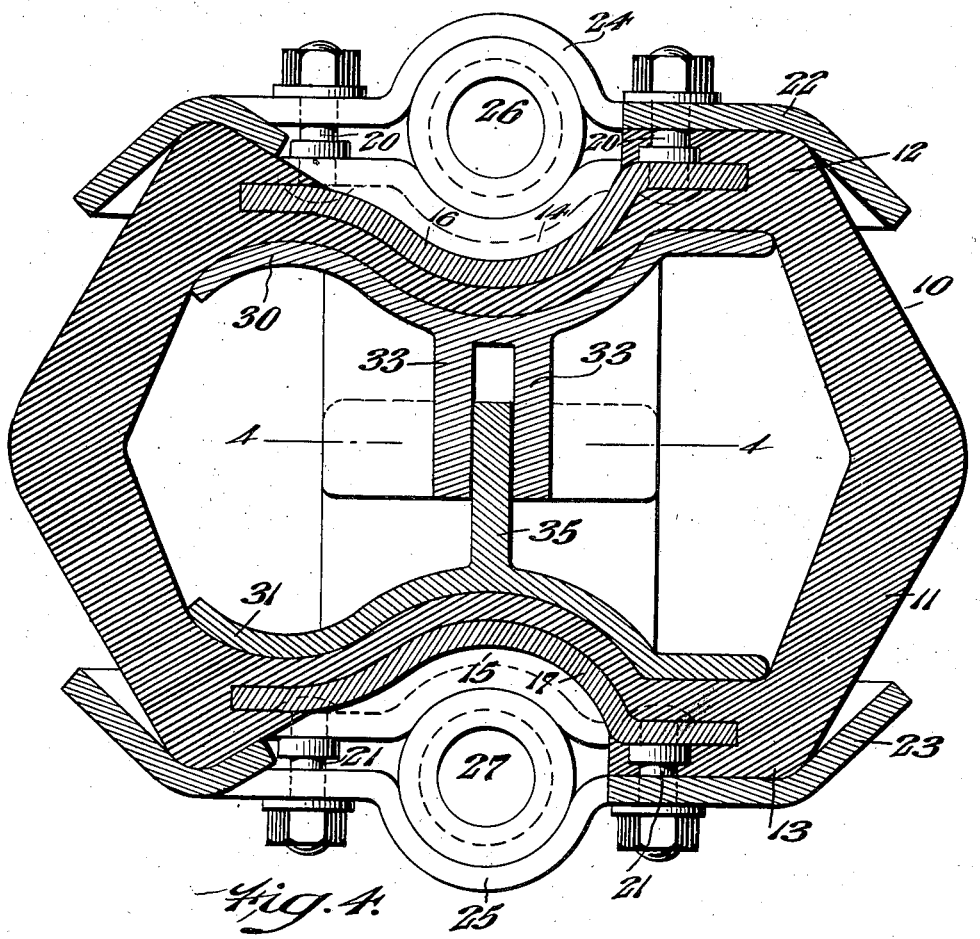
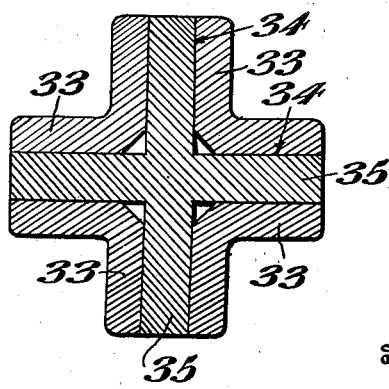
Inventor
Alfred Weiland.
By Robert M. Barr.
Attorney Patented Mar. 30, 1926.

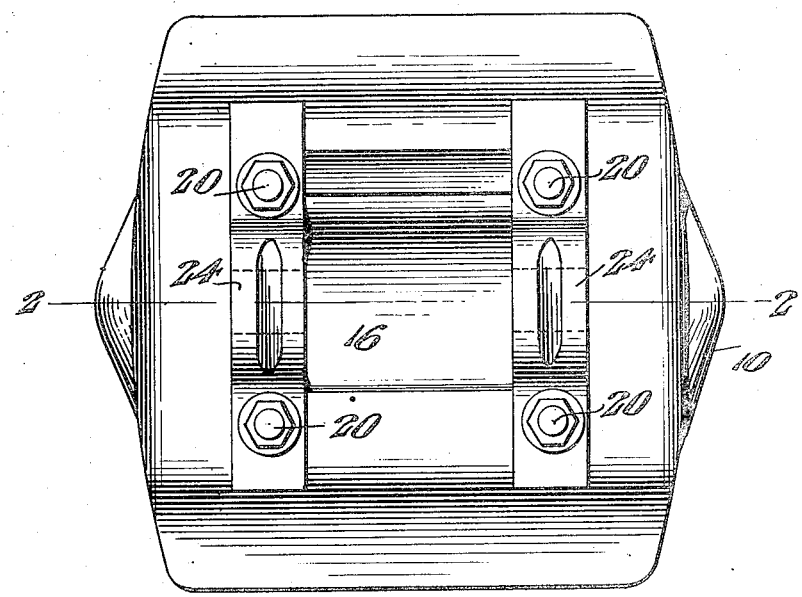
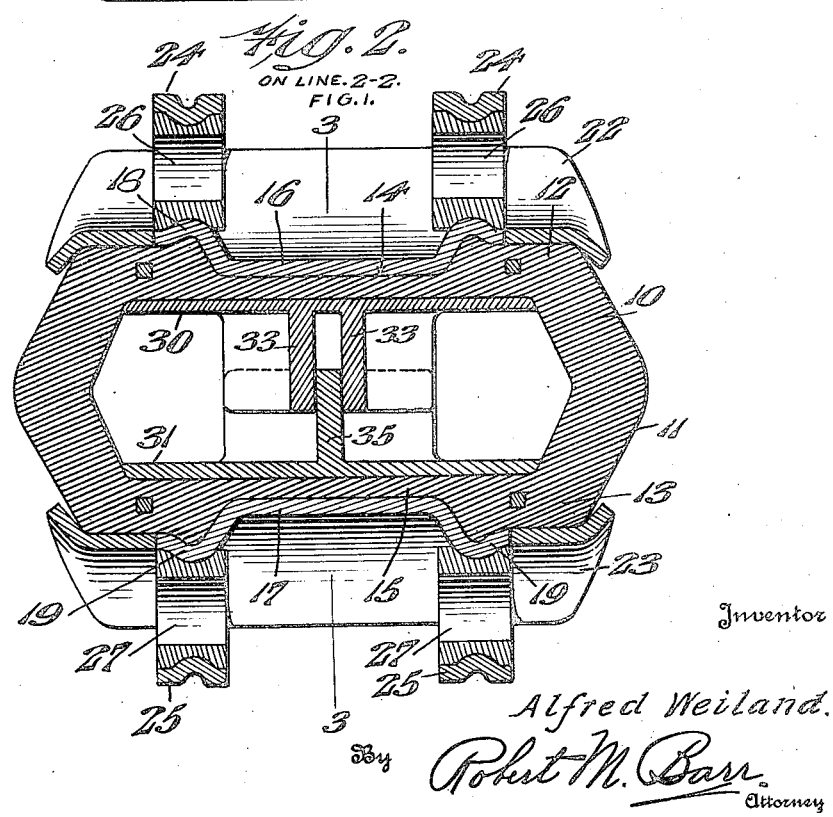

1,579,188

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

SHOCK ABSORBER.

Application filed August 6, 1925. Serial No. 48,556.

*To all whom it may concern:*

Be it known that I, ALFRED WEILAND, a citizen of the United States, and a resident of Neshanic, county of Somerset, State of New Jersey, have invented certain new and useful Improvements in Shock Absorbers, of which the following is a specification.

The present invention relates to shock absorbers for vehicles, and has for some of its objects to provide an improved device for shock reduction which functions in the direction of the shock producing lines of force; to provide a complete unitary expansible shock absorbing element and rigid connecting means therefor; to provide an improved means for preventing side sway or lateral thrust in pneumatic shock absorbers; to provide a rigid reinforcing means on the interior of a flexible absorbing member to distribute impact stresses; to provide a shock absorber with means in the form of upper and lower reinforcing plates molded into the absorbing element to serve as stress distributors and forming interfitting sliding connections between such plates; to provide an improved molded in fastening means for two opposite ends of an expansible member; and to provide other improvements as will hereinafter appear.

In the accompanying drawings, Fig. 1 represents a plan of a shock absorber embodying one form of the present invention; Fig. 2 represents a section on line 2—2 of Fig. 1; Fig. 3 represents a section on line 3—3 of Fig. 2; and Fig. 4 represents a section on line 4—4 of Fig. 3.

Referring to the drawings, one form of the present invention comprises a hollow resilient member 10 of generally circular or uniform configuration in plan, and relatively flat in elevation, but having its side bounding walls 11 outwardly converging from the top and bottom to meet at substantially the median plane of the member. These walls 11 in section are relatively thick at the medial port but taper away therefrom on both sides so that they merge respectively into the top wall 12 and bottom wall 13 with substantially the same thickness. This construction provides a relatively heavy circumferential section, the tendency of which is to resist lateral expansion and the action of the walls therefore under compression is to distend and retract along the two circumferential lines of minimum wall thickness, with the result that a nicely balanced kneading movement takes place which effectually absorbs the transmitted shock. Preferably the member 10 is molded with a predetermined pressure confined within its walls, but the invention is not limited to any specific means of placing the interior of the member under pressure.

For mounting the member 10 between two parts of a vehicle to absorb the transmission of shocks from one part to the other, the top and bottom surfaces are molded respectively with transverse grooves 14 and 15 which are lined respectively with metal plates 16 and 17, the ends of which are embedded in the material of the member as seen in Fig. 3, and is done during the molding of the member. The plates 16 and 17 are further anchored by the provision of angular offsets 18 and 19 into which the material flows and forms to the contour of the offsets so that relative movement is resisted. These plates 16 and 17 are respectively provided with outwardly projecting stud shanks 20 and 21, four to each plate, for the purpose of attaching cap plates 22 and 23 which not only seat upon opposite ends respectively of the member 10 but have arched ribs 24 and 25 cooperating as a clamping means upon bushings 26 and 27. These bushings 26 and 27 seat respectively upon the offsets 18 and 19 and serve, in assembled condition, as bolt holes or pivot bearings for the fastening devices which are attached respectively to the two parts of the vehicle.

In order to limit the movement of the expansible member under riding conditions to a substantially straight line action and eliminate side sway two plates 30 and 31 are located in the hollow member 10, being inserted when the member is molded, and respectively forming a reinforcing top and bottom lining for the chamber containing the pressure medium. The plate 30 is formed with a plurality of depending angle ribs 33 which are spaced with respect to each other and form a groove 34 of right-angular cross-shape to receive an upstanding right-angular cross-shaped rib 35 formed integral with the plate 31. The parts have a snug sliding fit permitting movement of the two plates toward and away from each other while effectually preventing relative movement in a transverse direction. In this way side sway is resisted and prevented while the member 10 is free to compress and expand to minimize the shocks transmitted to it.

It will now be apparent that a complete unitary shock absorbing member has been devised wherein the parts are compact and arranged to produce the highest efficiency in operation. The expansible part of the device is so contracted and proportioned as to receive and equalize all normal transmitted shocks, while those parts which comprise the mounting for the expansible member are designed for cooperation with the member 10 and functioning with it to eliminate shocks and overcoming side to side movement of the body supported upon the device.

Having thus described my invention, I claim:

1. A shock absorber comprising an expansible hollow member, a pair of metal plates in said member forming respectively top and bottom linings therefor, interfitting means between said plates providing for relative movement of said plates towards and away from each other and preventing other relative movement, and means for respectively connecting said member at opposite ends to the frame and the spring of a vehicle.

2. A shock absorber comprising an expansible hollow member, a pair of metal plates in said member forming respectively top and bottom linings therefor, interfitting means between said plates providing for relative movement of said plates towards and away from each other and preventing other relative movement, and means including plates molded into said member for respectively connecting said member at opposite ends to the frame and the spring of a vehicle.

3. A shock absorber comprising an expansible hollow member, a pair of metal plates in said member forming respectively top and bottom linings therefor, interfitting means between said plates providing for relative movement of said plates towards and away from each other and preventing other relative movement, and means including transversely grooved plates molded into said member for respectively connecting said member at opposite ends to the frame and the spring of a vehicle.

4. A shock absorber comprising an expansible hollow member, a pair of metal plates molded respectively into the inner top and bottom walls of said member, one of said plates having a depending part, the other of said plates having an upstanding part interfitting with said depending part, thereby providing for relative movement of said plates towards and away from each other and preventing other relative movement, and means for respectively connecting opposite ends of said member to the frame and the spring of a vehicle.

5. A shock absorber comprising an expansible hollow member, a pair of metal plates molded respectively into the inner top and bottom walls of said member, one of said plates having a cross-shaped rib, and the other of said plates having angular ribs forming a cross-shaped groove to receive said rib, thereby providing for relative movement of said plates towards and away from each other and preventing other relative movement, and means for respectively connecting opposite ends of said member to the frame and the spring of a vehicle.

6. A shock absorber comprising an expansible hollow member, a pair of metal plates in said member forming respectively top and bottom lining therefor, interfitting means between said plates providing for relative movement of said plates towards and away from each other and preventing other relative movement, means for respectively connecting said member at opposite ends to the frame and the spring of a vehicle comprising grooved plates molded respectively into opposite ends of said member, cap plates correspondingly grooved, bushings between said molded plates and said cap plates, and devices for clamping the respective cap plates to said grooved plates.

7. A shock absorber comprising an expansible member, plates molded into opposite ends respectively of said member and each having a transverse groove formed therein, cap plates respectively having grooves therein, devices for clamping said cap plates to the grooved plates, and bushings interposed between said pairs of plates to receive fastening devices respectively for the spring and frame of a vehicle.

Signed at New Brunswick, county of Middlesex, State of New Jersey, this 27th day of April, 1925.

ALFRED WEILAND.